United States Patent [19]

Hines

[11] Patent Number: 4,557,570
[45] Date of Patent: Dec. 10, 1985

[54] CAMERA ASSEMBLY FOR THREE-DIMENSIONAL PHOTOGRAPHY

[75] Inventor: Stephen P. Hines, Glendale, Calif.

[73] Assignee: Walt Disney Productions, Burbank, Calif.

[21] Appl. No.: 535,991

[22] Filed: Sep. 26, 1983

[51] Int. Cl.[4] .................. G03B 35/08; G03B 21/18; F16H 21/44; F04C 2/54
[52] U.S. Cl. ............................ 354/113; 52/790; 74/105; 74/471 XY; 352/57; 414/917
[58] Field of Search ........ 354/104, 112, 113, 117–119; 352/57, 60, 62, 65, 87–89; 52/786, 788, 790; 74/89.15, 105, 471 R, 471 XY; 414/917

[56] References Cited

U.S. PATENT DOCUMENTS

| | | | |
|---|---|---|---|
| 2,727,427 | 12/1955 | Jenkins | 352/89 |
| 2,838,975 | 6/1958 | Laube et al. | 354/113 |
| 2,916,962 | 12/1959 | Spottiswoode et al. | 354/113 |
| 3,152,369 | 10/1964 | Gottesleben | 52/790 X |
| 3,366,438 | 1/1968 | Hartman | 352/87 |
| 3,891,303 | 6/1975 | Barquero | 352/65 X |
| 4,303,316 | 12/1981 | McElveen | 352/57 |

Primary Examiner—Russell E. Adams
Assistant Examiner—Douglas S. Lee
Attorney, Agent, or Firm—Fulwider, Patton, Rieber, Lee & Utecht

[57] ABSTRACT

A camera assembly is provided for photographing a scene or subject from two slightly different positions with controlled three-dimensional effects for subsequent viewing, for example, with the assistance of special eyeglasses having appropriately filtered lenses. The camera assembly comprises a pair of cameras, such as two motion picture cameras, mounted onto a rigid frame for photographing a common scene or subject, with one of the cameras receiving light transmitted through a beamsplitter and the other camera receiving light reflected from the beamsplitter. One of the cameras is stationary on the frame whereas the other camera is movably supported by a mechanical control linkage to controllably vary three-dimensional effects by adjusting the lateral or interocular spacing between the nodal points of lens units for the two cameras and further by adjusting the movable camera to select the point of intersection, or convergence distance setting, of the camera sight lines within their fields of view. The mechanical control linkage advantageously permits adjustment in the interocular spacing with little or no change in the convergence distance setting, and further permits convergence distance setting adjustment with minimal or no effect upon the interocular spacing. Visible scales on the camera assembly frame provide a direct indication of the interocular spacing and convergence distance setting. Additional features include improved locking assemblies for positively seating the two cameras in place on the frame and an improved rigid beamsplitter mounting arrangement.

36 Claims, 29 Drawing Figures

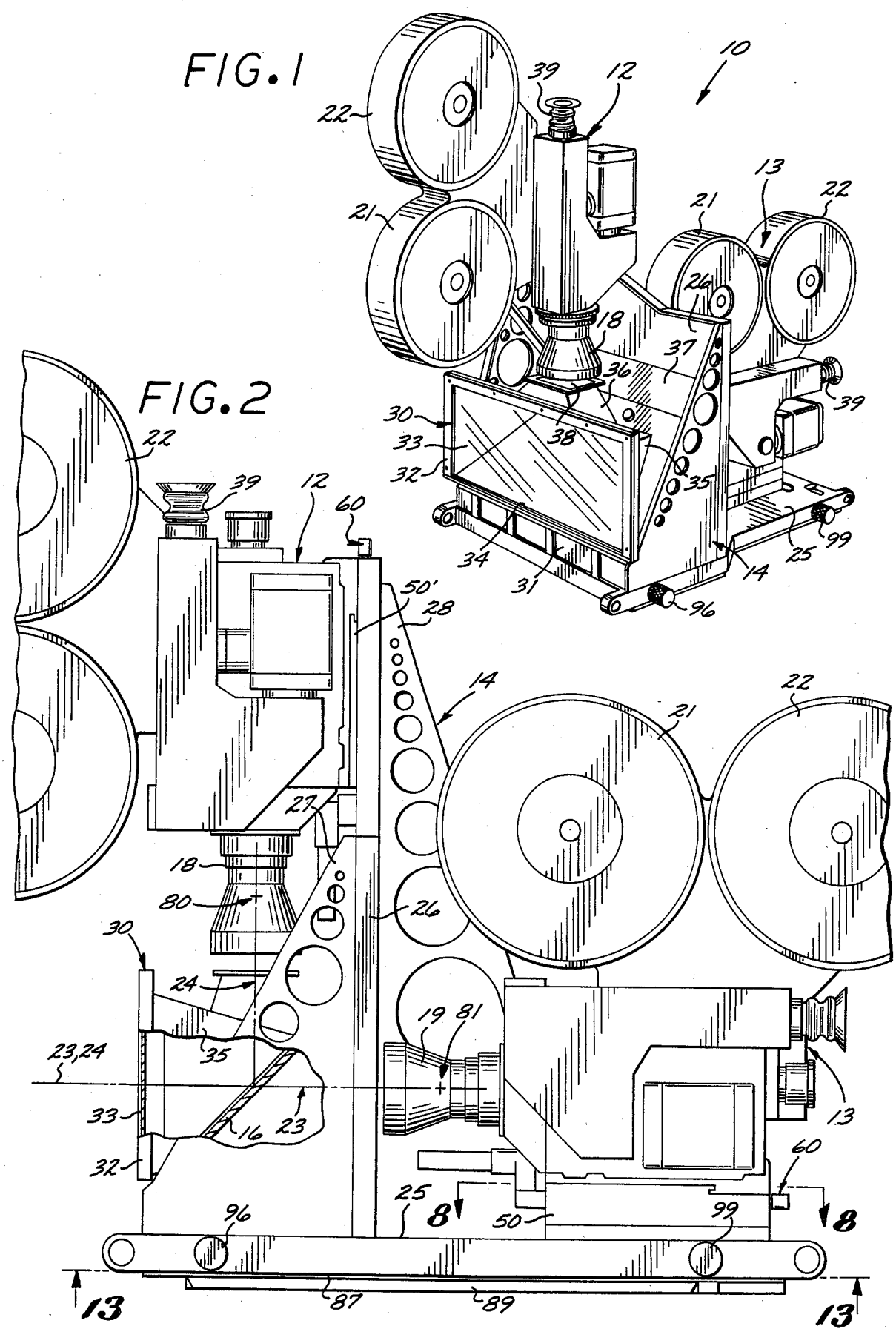

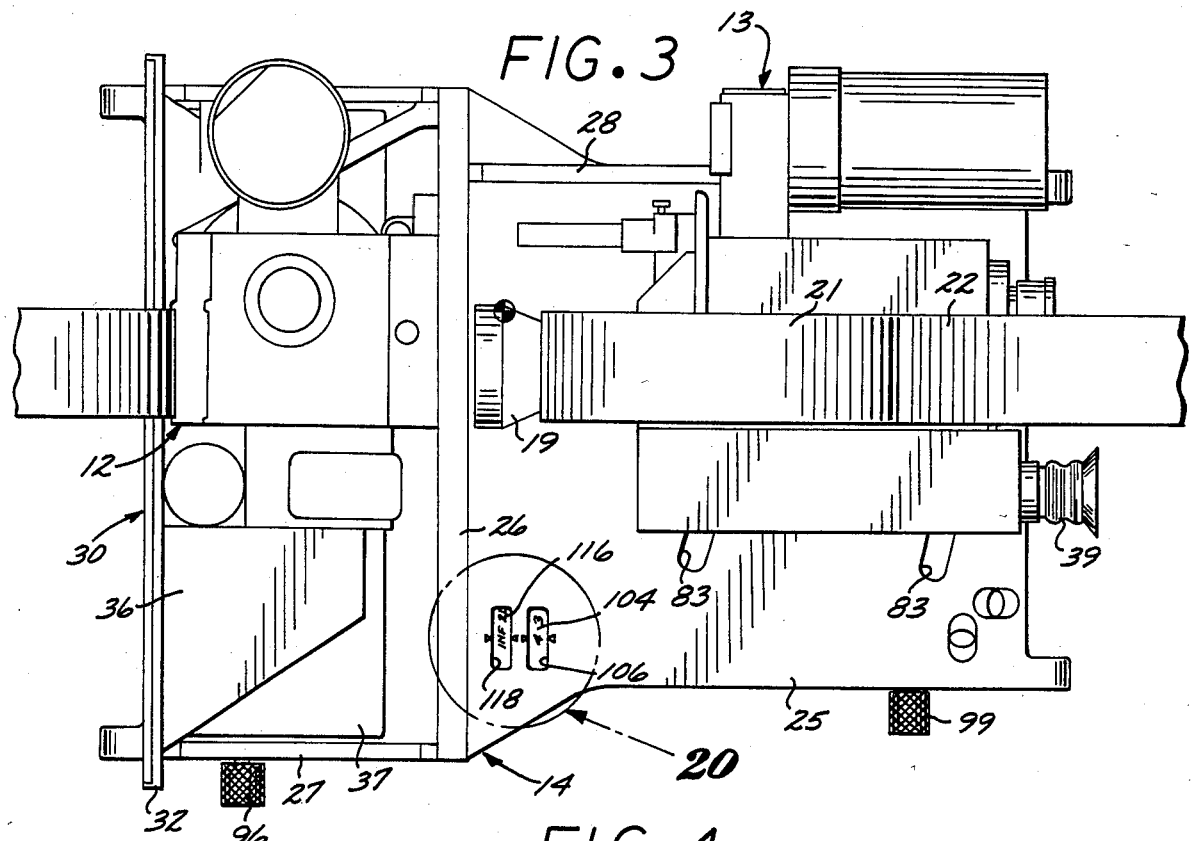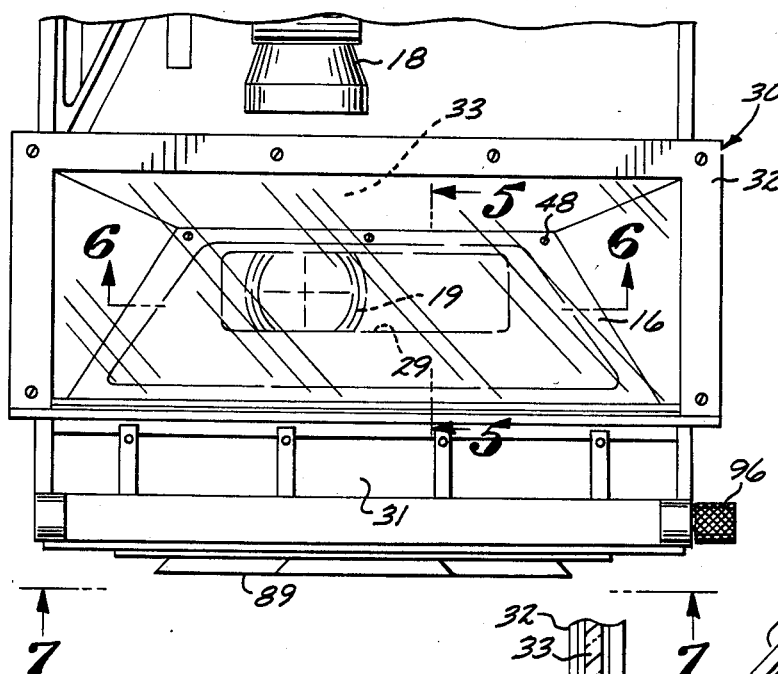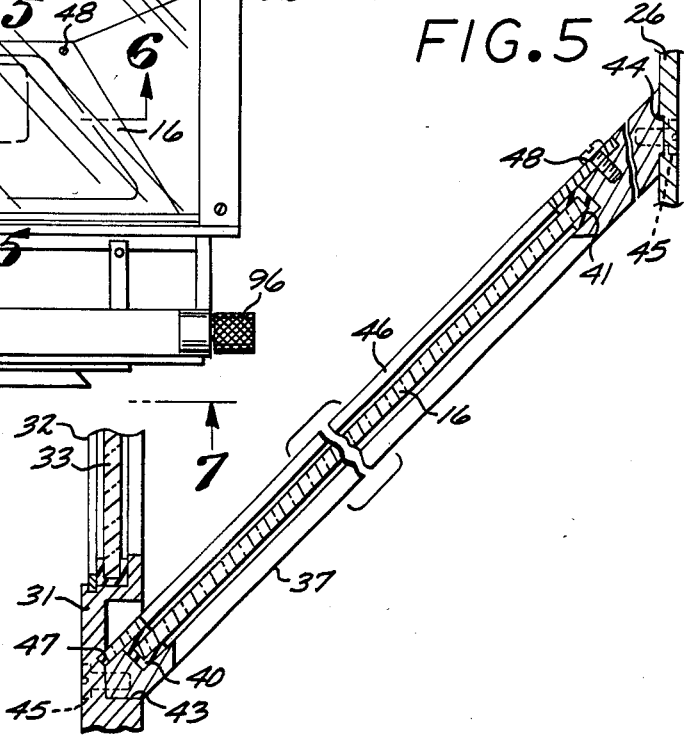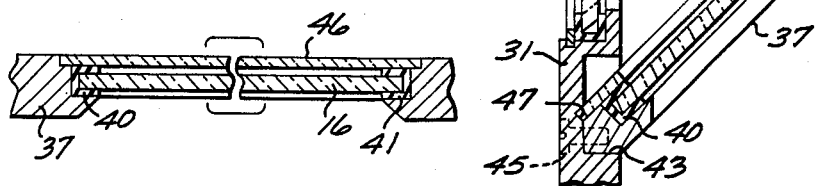

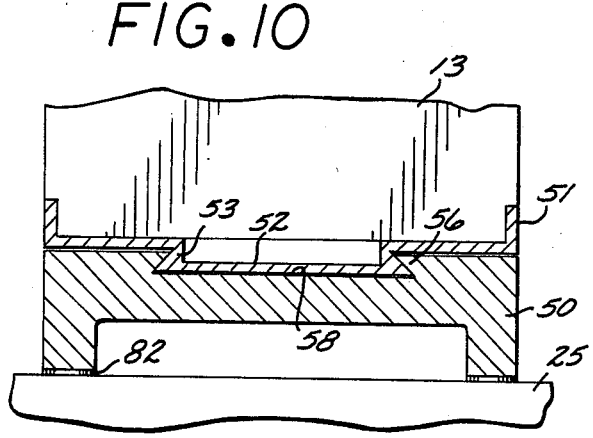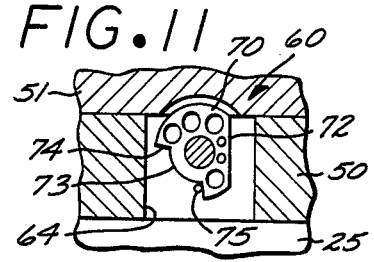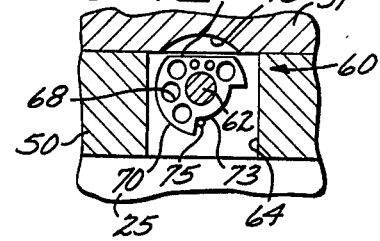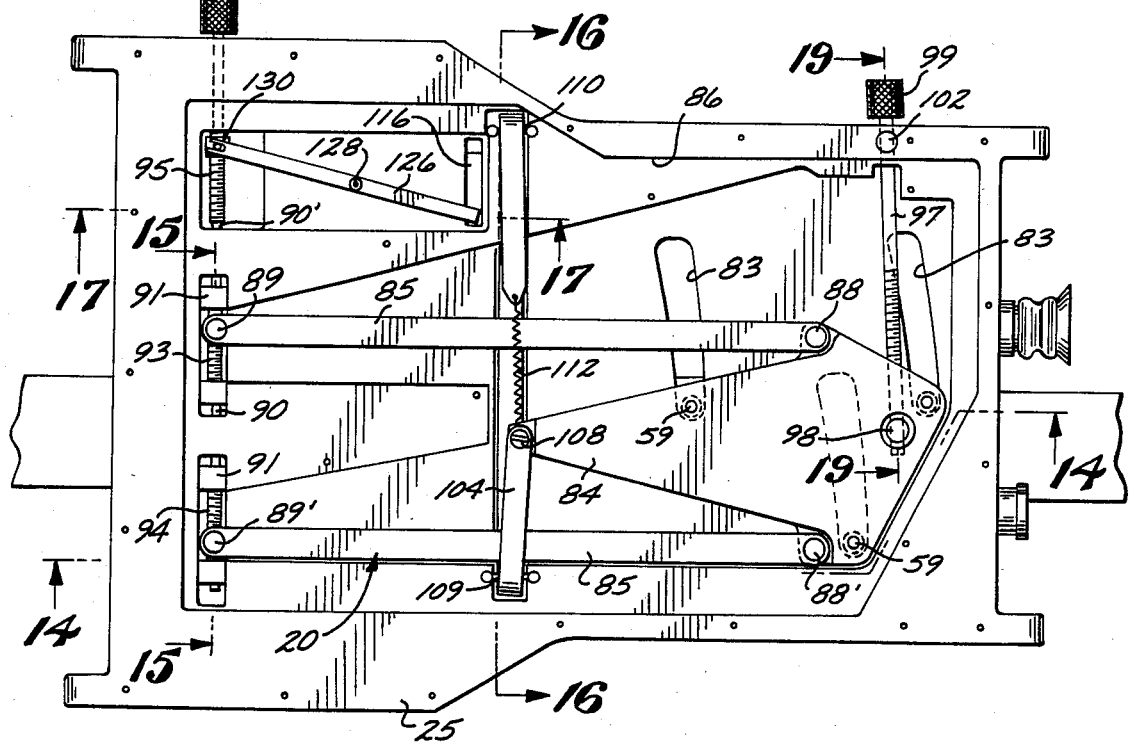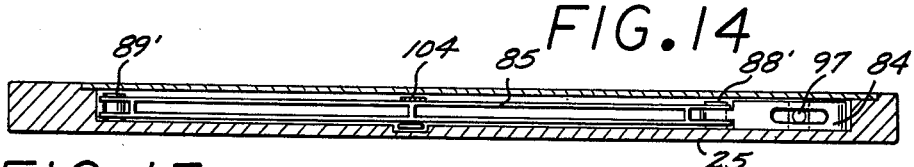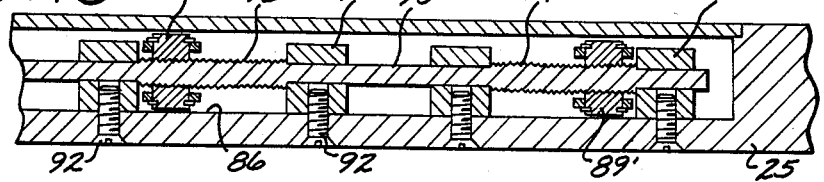

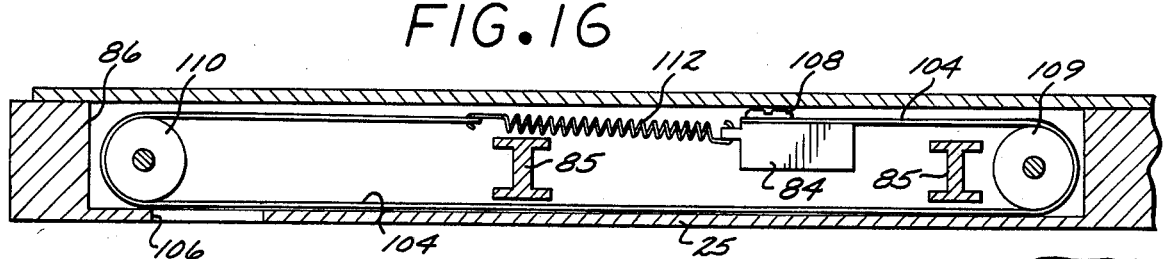
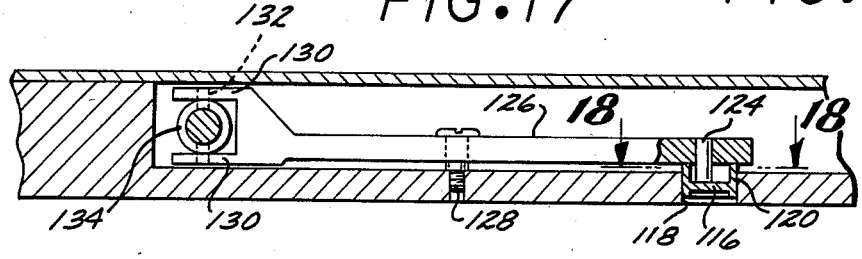
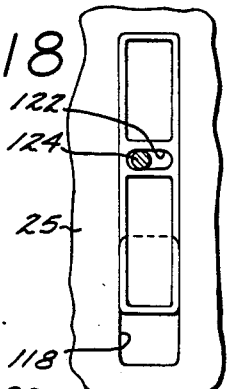
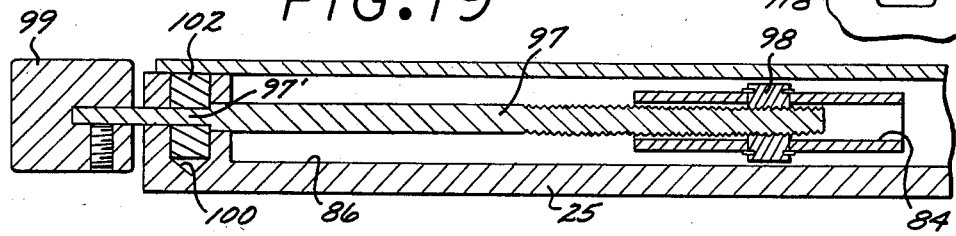
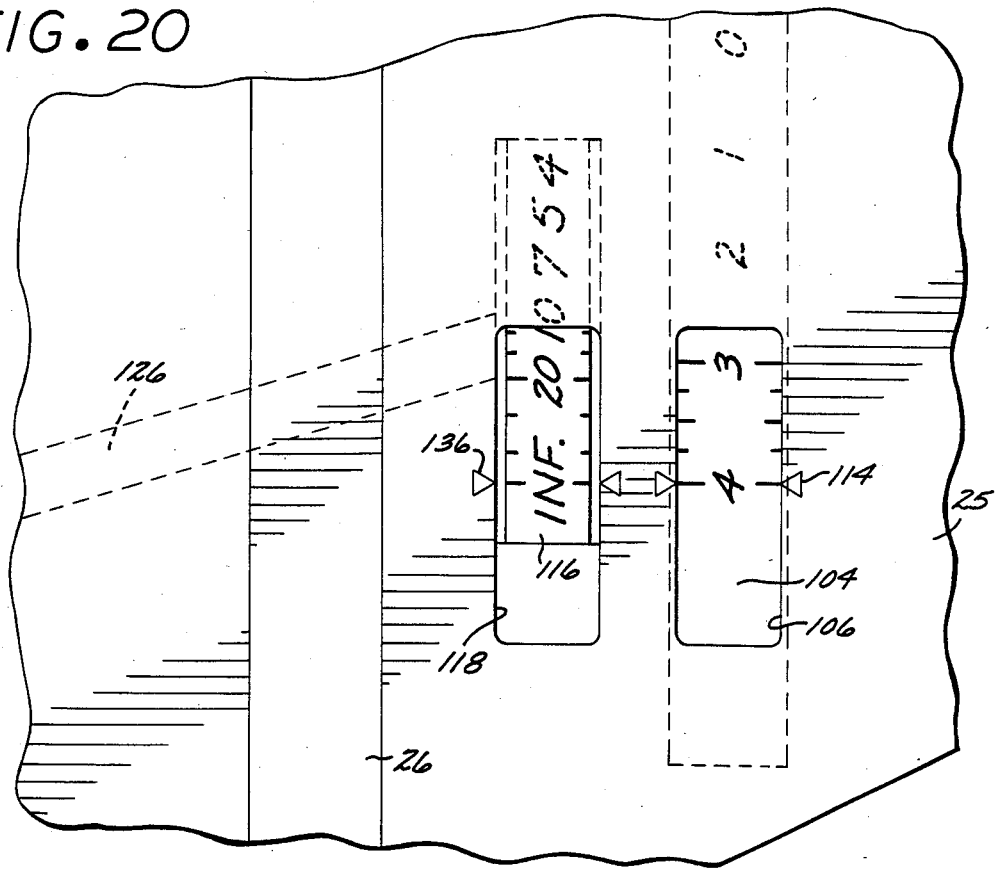

CAMERA ASSEMBLY FOR THREE-DIMENSIONAL PHOTOGRAPHY

BACKGROUND OF THE INVENTION

This invention relates generally to the field of three-dimensional photography. More particularly, this invention relates to a camera assembly having two cameras for photographing a scene or subject from two slightly different positions wherein the camera assembly includes improved control means for adjusting the relative positions of the cameras to correspondingly select and control three-dimensional photographic effects.

Three-dimensional imagery is a relatively well-known phenomenon wherein a two-dimensional image of a scene or subject appears to have a third dimension of depth. Such imagery has become popular in the motion picture and television industries and is normally achieved by simultaneously photographing a common scene or subject using two cameras mounted at two slightly different positions. The two resultant and slightly different photographic images of the scene or subject are then projected normally in a superimposed relation onto a two-dimensional surface or screen for audience viewing. Each viewer is equipped with a pair of special eyeglasses having filter lenses for separating the superimposed images such that the viewer's right and left eyes respectively observe the different images and thereby perceive a realistic-appearing third dimension of depth. According to one common technique referred to as the anaglyphic process, the eyeglass lenses have different colors, such as red and blue, to filter and separate the two images. Alternatively, in accordance with the so-called polarized process, the eyeglass lenses can comprise polarizing filters for separating the two images.

In photographing scenes or subjects from two slightly different positions, referred to herein as three-dimensional photography, the specific nature of the three-dimensional or 3-D effects can be varied dramatically by adjusting the relative positions of the two cameras photographing the scene. More particularly, the 3-D effects can be controlled and altered in accordance with the lateral separation or spacing between the nodal points of the lens units of the two cameras, wherein this spacing is frequently referred to as the "interocular spacing." For example, an interocular spacing of about 2.5 inches closely corresponds with the average spacing between the right and left eye of an adult viewer thereby providing a three-dimensional photographic effect of depth corresponding closely with that which would be perceived by an adult viewer standing generally at the camera location and observing the scene. Alternatively, an interocular spacing between the camera lenses of less than about 2.5 inches provides a reduced depth effect which progressively disappears as the interocular spacing approaches zero, whereas an interocular spacing greater than about 2.5 inches results in an enhanced or extended depth effect. Moreover, the interocular spacing can be increased during motion picture filming of a scene to create the appearance of progressive miniaturization or decreased during scene filming to create an opposite appearance of scene gigantization.

The particular nature of the 3-D effects in three-dimensional photography can also be controlled by orienting the two cameras for convergence of their sight lines to intersect at a selected distance from the cameras and at a selected point within the depth of a scene being photographed. This adjustment or distance setting is commonly referred to as the "convergence distance setting." When the two resultant photographs of the scene are projected onto a two-dimensional screen for 3-D viewing, as described above, objects within the scene positioned generally at a distance from the cameras corresponding with the camera sight line intersection point will appear to viewers to be located at a depth corresponding with the screen distance. However, subjects located in the foreground or background relative to the camera sight line intersection point will appear to viewers to be positioned respectively in front of and behind the projection screen. Variation in the convergence setting during motion picture filming of a scene can result in subjects appearing to move forwardly or rearwardly within the scene without requiring actual subject movement during filming.

A variety of camera equipment and camera assemblies have been developed for use in three-dimensional photography, particularly in the motion picture industry. Some such equipment has provided a pair of cameras mounted at a fixed interocular spacing or convergence setting thereby precluding or undesirably complicating control over and variation in three-dimensional effects during filming. Other types of 3-D camera equipment have been developed including movable camera mountings for permitting changes in the interocular spacing and convergence setting; however, while such equipment has permitted variation in 3-D effects, changes in interocular spacing have concurrently caused significant changes in the convergence setting and vice versa. This significant interdependency between interocular spacing and convergence setting has rendered such previous 3-D camera equipment extremely difficult to operate and control, particularly with respect to accurate adjustment of three dimensional effects in the course of filming a single scene.

There exists therefore, a significant need for an improved camera assembly for use in three-dimensional photography, wherein the camera assembly includes a pair of cameras mounted for substantially independent interocular spacing and convergence setting adjustment. The present invention fulfills this need and provides further related advantages.

SUMMARY OF THE INVENTION

In accordance with the invention, an improved camera assembly is provided for photographing a scene or subject with controllable and selectively variable three-dimensional effects. The camera assembly comprises two cameras mounted on a common frame for photographing a common scene. The cameras are arranged in close association with a beamsplitter for receiving scene light respectively passing through and reflected from the beamsplitter. One of the cameras is stationarily mounted on the frame while the other camera is movably supported by a mechanical control linkage which accommodates substantially independent adjustment of the interocular spacing between the lenses of the two cameras and the convergence distance setting or intersection point of the camera sight lines.

In one preferred form of the invention, the mechanical control linkage comprises a four-bar linkage carried within a substantially closed linkage housing forming a portion of the assembly frame. The four-bar linkage includes a pair of relatively long side links pivotally connected between a corresponding pair of comparatively substantially shorter end links. One of the end links constitutes a frame link fixed against pivoting motion relative to the assembly frame, and the other end link comprises a camera link secured to and movable with the movable camera. Swinging movement of the four-bar linkage with respect to the frame alters the interocular spacing between the two cameras, with a preferred spacing adjustment range being on the order of zero to 4.0 inches, substantially without varying the convergence distance setting. The convergence distance setting is adjusted by varying the length of the frame link thereby shifting the locations of its pivot points relative to the elongated side links. This alteration in frame link length displaces the movable camera relative to the stationary camera in a manner to shift the distance at which the camera sight lines intersect, with a preferred adjustment range being on the order of about 4.0 feet to infinity, and with minimal or no change in the interocular spacing.

In one preferred form, interocular spacing and convergence distance setting are adjustably controlled by manual or motorized rotation of separate control knobs on the assembly frame. One control knob rotates a control rod having a threaded portion engaged with a threaded nut on the camera end link, resulting in translation of the threaded nut along the control rod to move the camera end link and the movable camera in a manner adjusting the interocular spacing. The other control knob rotates a shaft which forms the frame end link and includes oppositely threaded lead screw portions carrying lead screw nuts respectively pivoted to the side links. Accordingly, shaft rotation moves the lead screw nuts toward or away from each other to effectively vary the length of the frame end link and thereby also select convergence distance setting.

In one preferred construction of the camera assembly, the beamsplitter comprises a partially or half-silvered mirror and is mounted on the frame to reflect and transmit scene light in substantially equally portions respectively to the stationary camera and to the movable camera. In an alternative construction, the beamsplitter is mounted to reflect and transmit scene light in substantially equal portions respectively to the movable camera and to the stationary camera. In either construction, the beamsplitter is supported on the frame in a stationary position by an improved mounting arrangement including a peripheral, channel-shaped resilient mounting gasket seated into a gasket recess bordering a central opening in a mounting bracket plate secured to the assembly frame. An apertured retainer plate is mounted on the bracket plate in overlying relation with the beamsplitter and gasket to lock the beamsplitter in place. This mounting arrangement rigidly supports the beamsplitter against movement, deformation, or vibration during use of the camera assembly.

According to further features of the invention, visible reference scales are coupled to the camera end link and to the frame end link of the four-bar control linkage to provide an externally viewable and accurate indication of the interocular spacing and the convergence distance setting. In the preferred form, the interocular spacing scale comprises a graduated tape scale supported on rollers within the linkage housing and coupled with an extension of the camera link for movement with the lens unit nodal point of the movable camera, wherein the tape scale movement is observable through a viewing window in the frame. The convergence distance setting scale comprises a graduated slide scale coupled to the threaded frame link shaft for back-and-forth movement observable through a separate viewing window.

In accordance with additional aspects of the invention, each of the two cameras carries a wedge-shaped foot of generally dovetail cross section for sliding and seated reception into a conforming pocket within a mounting shoe on the assembly frame. A locking assembly associated with each mounting shoe includes a rotatable bolt threadably supporting a locking cylinder having a radial lobe for locking reception into a recess in the camera foot to prevent camera removal and, upon further turning of the bolt in one direction, for forcing the camera foot to a positively and fully seated position within the mounting shoe pocket. Opposite bolt rotation withdraws the lobe from the camera foot recess and aligns a radially recessed flat on the cylinder with the recess to permit unrestricted sliding removal of the camera foot from the mounting shoe.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a front perspective view illustrating the camera assembly for three-dimensional photography embodying the novel features of the invention;

FIG. 2 is an enlarged fragmented side elevation view of the camera assembly, with portions broken away to illustrate operative association of a pair of motion picture cameras and their operative relationship with an optical beamsplitter;

FIG. 3 is an enlarged fragmented top plan view of the camera assembly;

FIG. 4 is an enlarged fragmented front elevation view of a portion of the camera assembly;

FIG. 5 is an enlarged fragmented and generally vertical section taken generally on the line 5—5 of FIG. 4;

FIG. 6 is an enlarged fragmented horizontal section taken generally on the line 6—6 of FIG. 4;

FIG. 10 is a fragmented transverse vertical section taken generally on the line 10—10 of FIG. 8;

FIG. 11 is a fragmented vertical section taken generally on the line 11—11 of FIG. 9 and illustrating a camera locking assembly in a locked position;

FIG. 12 is a fragmented vertical section generally similar to FIG. 11 and illustrating the locking assembly in an unlocked position;

FIG. 13 is a fragmented horizontal section through a lower linkage housing portion of the camera assembly, taken generally on the line 13—13 of FIG. 2 and illustrating a mechanical control linkage for controlling movement of one of the cameras;

FIG. 14 is a generally longitudinal vertical section taken generally on the line 14—14 of FIG. 13;

FIG. 15 is an enlarged fragmented transverse vertical section taken generally on the line 15—15 of FIG. 13;

FIG. 16 is an enlarged fragmented transverse vertical section taken generally on the line 16—16 of FIG. 13;

FIG. 17 is an enlarged fragmented longitudinal vertical section taken generally on the line 17—17 of FIG. 13;

FIG. 18 is a fragmented horizontal section taken generally on the line 18—18 of FIG. 17;

FIG. 19 is an enlarged fragmented generally transverse vertical section taken generally on the line 19—19 of FIG. 13;

FIG. 20 is an enlarged top plan view of the region 20 encircled in FIG. 3 and illustrating interocular spacing and convergence distance setting reference scales;

DETAILED DESCRIPTION OF THE PREFERRED EMBODIMENT

Figure 7:
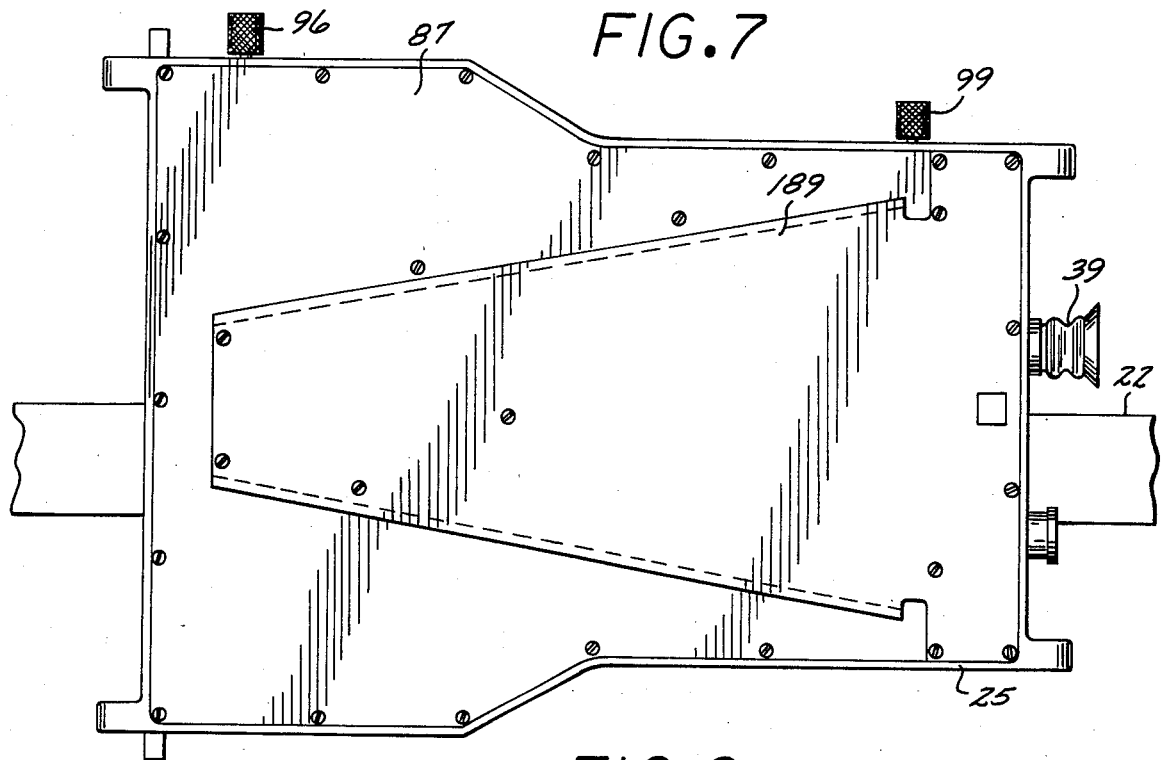
FIG. 7 is an enlarged fragmented bottom plan view of the camera assembly taken generally on the line 7—7 of FIG. 4.

As shown in the exemplary drawings, an improved camera assembly referred to generally by the reference numeral 10 is provided for photographing scenes or subjects with controlled and selectively variable three-dimensional effects. The camera assembly 10 comprises a pair of identical or compatible cameras 12 and 13 removably mounted on a rigid frame 14 in close association with a beamsplitter 16 supported angularly by the frame for permitting the cameras to photograph a common scene or subject. The camera 12 is mounted in a stationary position on the frame 14 and has a downwardly presented lens unit 18 for receiving light reflected upwardly from a reflective front surface of the beamsplitter 16. The camera 13 is movably supported with respect to the frame 14 by a mechanical control linkage 20 (FIG. 13) and includes a forwardly presented lens unit 19 (FIG. 2) for receiving light transmitted through the beamsplitter 16. The mechanical control linkage 20 permits controlled displacement of the movable camera 13 for substantially independent adjustment of the interocular spacing and the convergence distance setting of the cameras.

The camera assembly 10 of this invention provides a relatively simple yet highly versatile camera assembly construction for improved control of three-dimensional or 3-D effects in three-dimensional photography. The camera assembly 10 provides the two cameras 12 and 13 which may comprise still or motion picture cameras with identical motion picture cameras including appropriate reels 21 and 22 for film supply and take up being shown in the drawings by way of example, for photographing a scene or subject from two different and slightly spaced positions. The cameras 12 and 13 thus produce, when operated in synchronism, two slightly different photographic images of a common scene wherein these images can be projected in a known manner onto a common two-dimensional surface, such as a projection screen, typically in a superimposed relation. The slightly different images are then viewable following conventional 3-D viewing techniques, such as observing the superimposed images through special eyeglasses having appropriate filter lenses, such that the viewer's right and left eyes separately observe the images resulting in a perception of a third dimension, namely, depth.

The camera assembly 10 permits, by means of the mechanical control linkage 20, a controlled position shifting of the movable camera 13 in a generally horizontal or lateral direction relative to the stationary camera 12. Such lateral movement of the movable camera 13 thereby controls the lateral spacing or separation between nodal points of the lens units 18 and 19 of the two cameras, wherein this spacing is commonly termed the "interocular spacing," with a corresponding direct effect upon the depth appearance of photographed images. In addition, the control linkage 20 permits the movable camera 13 to be positioned angularly relative to the stationary camera 12 such that the camera 13 has its sight line, as referred to by arrow 23 in FIG. 2, positioned to converge with and angularly intersect the sight line 24 of the stationary camera at a predetermined distance from the camera assembly. This distance setting, normally referred to as the "convergence distance setting," has a direct effect upon the appearance of photographed images relative to a screen onto which the images are projected. Importantly, in accordance with a primary feature of the invention, the control linkage 20 permits adjustment in the interocular spacing substantially without changing the convergence distance setting and further accommodates convergence setting adjustment with minimal or no effect upon the interocular spacing. The camera assembly 10 can thus be controlled accurately and relatively easily to select and control the desired three-dimensional effects or combination of effects in resultant photographic images.

The camera assembly 10 is shown in detail in FIGS. 1-4 to include the frame 14 having a relatively rigid but lightweight construction formed from interconnected metal components or the like to provide stable support for the two cameras 12 and 13. The exemplary frame 14 is shown to include a generally horizontal lower baseplate 25 connected in any suitable manner to a generally upright and centrally positioned transverse support plate 26. Front and rear gussets 27 and 28 of a generally triangular shape and including perforations for weight conservation are connected between the baseplate 25 and the upright support plate 26 to improve the overall structural rigidity of the assembly frame 14.

The upright support plate 26 provides over a lower region thereof a rear wall of a beamsplitter housing 30 within which the beamsplitter 16 is securely mounted. This beamsplitter housing 30 further includes a short upstanding front wall 31 extending transversely across a front end of the baseplate 25 and joined at its upper extent to a horizontally elongated and generally rectangular frame unit 32 which supports a transparent protective front panel 33 of glass or the like over a rectangular opening 34 at the front of the beamsplitter housing. The opposite sides and the upper margin of the frame unit 32 are connected respectively to rearwardly extending side walls 35 and an upper housing hood 36 which in turn merge with and are joined to a rearwardly angled mounting bracket plate 37 secured to the upright support plate 26 to enclose the beamsplitter housing 30.

As shown best in FIGS. 4–6, the beamsplitter 16 is rigidly supported within the beamsplitter housing in an angular orientation tilted rearwardly from a lower front margin thereof at an angle with respect to the generally horizonal frame baseplate 25, wherein this angle is selected for appropriate reflection and transmission of scene light respectively to the lens units of the two cameras. This beamsplitter 16 comprises a so-called half- or partially silvered mirror of known construction designed to receive light from a scene or subject through the transparent front panel 33. The beamsplitter 16 has a reflective front surface for reflecting a portion of the incident light along the sight line 24 of the stationary camera upwardly through a viewing window 38 in the housing hood 36 for passage along the sight line 24 into the lens unit 18 of the stationary camera 12. In addition, the beamsplitter 16 transmits or passes without reflection a substantially equal portion of the incident light along the sight line 23 of the movable camera 13 through a horizontally elongated rear window 29 in the support plate 26 and further into the associated lens unit 19. Accordingly, the beamsplitter 16 permits both cameras to photograph the same scene or subject and, in this regard, the cameras are normally equipped with conventional eyepieces 39 through which the scene to be photographed can be observed by the cameraman.

The beamsplitter 16 is mounted within the housing 30 in a manner protected against vibrations, deformations, or other movements which could otherwise adversely affect the image reflected to the stationary camera 12 during use. More particularly, the functional area of the beamsplitter 16 has a generally trapezoidal shape, as viewed in FIG. 4, with its periphery seated within a channel-shaped resilient mounting gasket 40, as shown best in FIGS. 5 and 6. This mounting gasket 40 is in turn sized for seated reception into a gasket recess 41 bounding a trapezoidal-shaped central opening 42 formed in the bracket plate 37. The lower front margin of this bracket plate 37 is shaped to seat within a recess 43 at the inboard side of the housing front wall 31, whereas the upper rear bracket plate margin includes a transversely elongated key 44 for fitting into a conforming keyway formed on the front surface of the upright support plate 26. Mounting screws 45 may be further provided to securely anchor the bracket plate with respect the front wall 31 and support plate 26. In addition, a retainer plate 46 with a trapezoidal opening is fitted over the beamsplitter 16 with its lower margin resting within a front wall trough 47 and its upper margin secured to the bracket plate by screws 48 or the like to entrap the beamsplitter and its mounting gasket 40 securely in place.

The cameras 12 and 13 are removably installed on the frame in the desired positions oriented with respect to the beamsplitter 16 by a camera mounting arrangement which assures positive seating and locking of the cameras in precisely the desired positions. More particularly, with reference to FIGS. 2 and 8–12, the mounting arrangement for the movable camera 13 is shown in detail for positively locking the movable camera within a mounting shoe 50 which in turn couples the camera 13 for movement with the mechanical control linkage 20, as will be described in more detail. The mounting arrangement for the stationary camera 12 is identical with that provided for the movable camera 13 and includes a mounting shoe 50' on the upper front surface of the frame support wall 26. Accordingly, with the exception of the structure to which the mounting shoes 50 and 50' respectively are attached, the following description pertaining to the movable camera mounting arrangement will be understood to be applicable to the mounting arrangement for the stationary camera 12.

Figure 8:
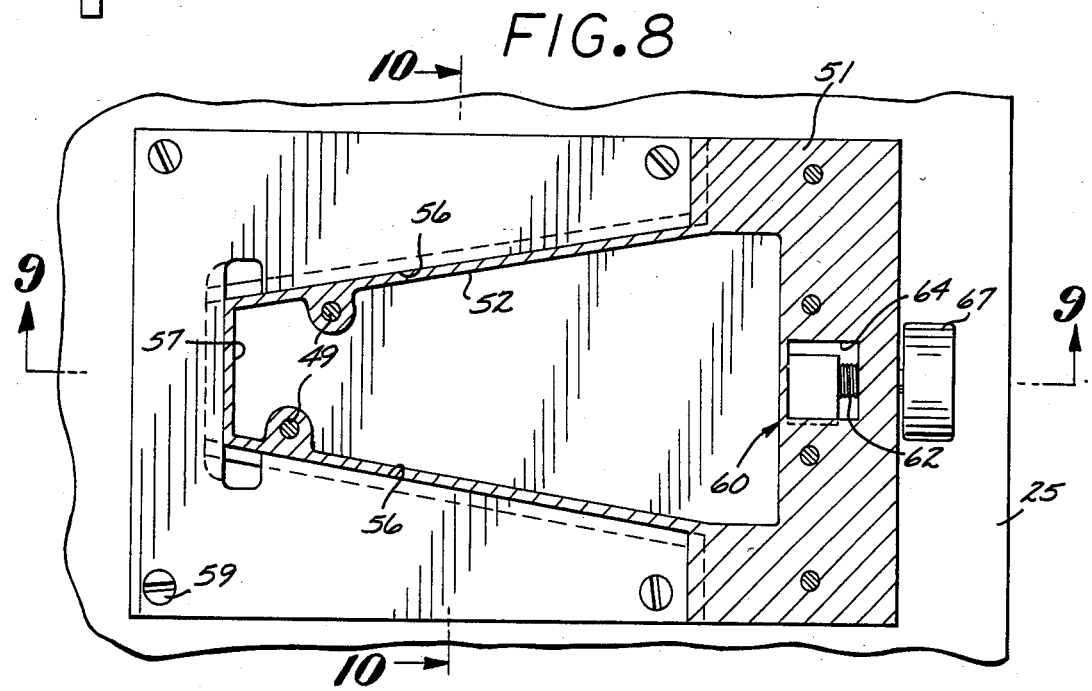
FIG. 8 is an enlarged fragmented horizontal section taken generally on the line 8—8 of FIG. 2.

As shown in FIGS. 8–12, a soleplate 51 is secured onto the underside of the movable camera 13 in any appropriate manner as by screws 49 (FIG. 8). This soleplate 51 includes a lower central region (FIG. 10) defining a depending foot 52 of a truncated, generally wedge-shaped cross section with undercut or dovetail-shaped side walls 53 converging in a direction toward the front of the camera. The forwardmost end of the foot 52 is squared off and is shaped to provide a forwardly open recess 54 (FIG. 9) bounded at its lower extent by a forwardly projecting toe 55.

The wedge-shaped foot 52 on the soleplate 51 is matingly slidable into a conforming wedge-shaped pocket formed on an upper surface of the mounting shoe 50 (FIGS. 8 and 10). More particularly, this wedge-shaped pocket is defined by opposed side walls 56 of an undercut or dovetail shape and converging in a direction toward the beamsplitter housing with forward ends joined to a squared-off front wall in the form of a short rearwardly projecting lip 57 (FIG. 9) spaced slightly above a flat bottom surface 58 of the pocket.

The camera 13 is installed quickly and easily onto the assembly frame 14 by sliding reception of the wedge-shaped foot 52 into the correspondingly shaped pocket of the mounting shoe 50 (FIG. 10), wherein this mounting shoe is in turn connected to the mechanical control linkage 20 by a plurality of bolts 59. The forward end of the soleplate foot 52 is insertable quickly and easily into the rearwardly open end of the mounting shoe pocket whereupon the foot 52 is slidably moved in a forward direction until the toe 55 thereon seats beneath the lip 57 at the forwardmost end of the pocket. Installation of the stationary camera with respect to its associated mounting shoe 50' is achieved in the same manner.

In accordance with one aspect of the improved camera assembly 10, each of the mounting shoes 50 and 50' includes an improved locking assembly 60 (FIGS. 9 and 11) which can be operated quickly and easily to insure positive seating and locking of the cameras 12 and 13 when mounted on the frame 14. The locking assembly 60 associated with the movable camera 13 is shown in detail in FIGS. 8, 9, 11, and 12 and will be described herein as representative of both locking assemblies.

Figure 9:
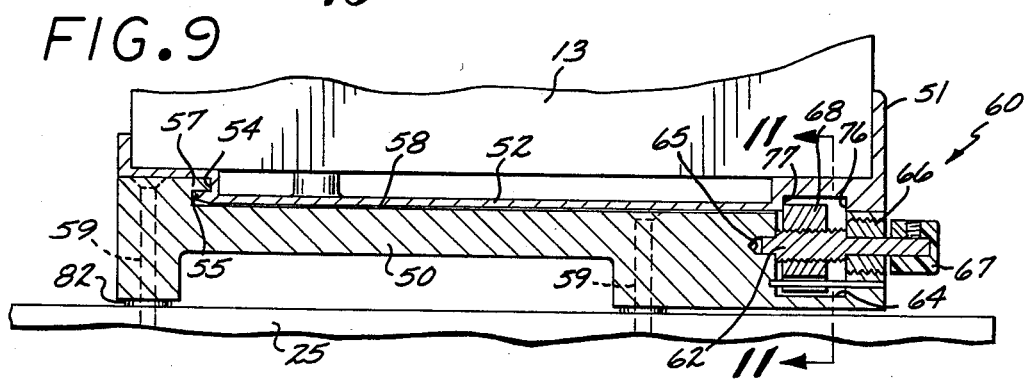
FIG. 9 is a fragmented longitudinal vertical section taken generally on the line 9—9 of FIG. 8.

As shown best in FIG. 9, the illustrated locking assembly 60 comprises a locking bolt 62 having an externally threaded portion disposed within an upwardly open well 64 in the mounting shoe 50. This bolt threaded portion is interposed between a relatively short unthreaded spindle portion rotatably received within a small recess 65 at one side of the well and a similar but elongated spindle portion rotatably received through a bushing plug 66 threaded into an enlarged bore opening at an opposite side of the well, wherein this latter spindle portion is elongated and projects outwardly from the end of the mounting shoe 50 and has an easily grasped handle 67 secured thereon by a set screw or the like. Accordingly, manual rotation of the handle 67 is effective to correspondingly rotate the threaded portion of the locking bolt 62 within the well 64.

A locking cylinder 68 is threaded onto the threaded portion of the locking bolt 62 within the mounting shoe well 64 for engaging and seating the foot 52 within the mounting shoe pocket. This cylinder, which has an axial dimension somewhat less than the corresponding axial dimension of the well 64, is shown in more detail in FIGS. 11 and 12 to include a peripheral arcuate lobe 70 extending over approximately one-third of the cylinder periphery. This lobe 70 adjoins at one end a radially recessed peripheral flat 72 which also extends over approximately one-third of the cylinder periphery. A recessed arcuate slot 73 bounded by radially projecting side margins 74 separates the opposite end of the lobe 70 from the flat 72, and an axial stop pin 75 is carried by the mounting shoe to project through the well 64 for engagement with the slot side margins 74 as the locking cylinder is rotated.

Prior to installation of the camera 13 onto the frame 14, the locking bolt 62 is rotated in an appropriate direction to orient the flat 72 on the cylinder 68 in an upwardly presented position. In this position, the locking cylinder 68 does not extend above the bottom wall 58 of the mounting shoe pocket thereby permitting unrestricted sliding reception of the wedge-shaped foot 52 on the camera into said pocket. However, as the foot 52 nears a fully inserted position, an arcuate recess 76 in the soleplate 51 aligns over the mounting shoe well 64 at which time the locking bolt 62 is appropriately rotated to turn the arcuate lobe 70 upwardly into this recess 76, as shown in FIG. 11, to prevent removal of the foot from the shoe pocket. The stop pin 75 halts rotational movement of the cylinder 68 when the lobe is within the recess 76, and, upon continued locking bolt rotation which is viewed in FIG. 9, the cylinder axially advances the lobe 70 against a forward shoulder 77 of the recess 76 to positively force and seat the toe 55 on the foot 52 beneath the front lip 54 of the mounting shoe pocket thereby also seating the foot 52 within the shoe pocket.

Removal of the camera 13 is accomplished quickly and easily by reverse rotation of the handle 67 and locking bolt 62. Such reverse rotation initially retracts the cylinder lobe 70 slightly from the recess shoulder 77 and then turns the cylinder 68 within the limits of the arcuate slot 73 to a position with the flat 72 presented upwardly. Further locking bolt rotation may be performed to further retract the cylinder in an axial direction along the bolt 62 away from the recess shoulder 77, if desired. With the flat 72 presented upwardly, the wedge-shaped foot 52 can be slidably moved in a rearward direction out of the mounting shoe pocket to remove the camera 13 from the assembly frame 14.

When the cameras 12 and 13 are installed on the frame 14 as described above, the two cameras are oriented generally in an orthogonal relationship in the preferred form, as shown best in FIG. 2, for receiving reflected and transmitted light, respectively, from the beamsplitter which is oriented at an angle of about 45 degrees with respect to the frame baseplate 25. The respective mounting shoes 50' and 50 support the two cameras with the nodal points (referred to by arrows 80 and 81 in FIG. 2) of average sized lens units, such as the illustrated lens units 18 and 19, spaced at identical distances from the beamsplitter 16 and thus also at identical distances from the scene or subject being photographed. For example, in one working embodiment of the invention, the cameras 12 and 13 comprise synchronized 65 mm Mitchell motion picture cameras using 50 mm focal length lens units.

According to a primary aspect of the invention, the mounting shoe 50 for the movable camera 13 is secured by the bolts 59 to the mechanical control linkage 20 which accommodates movement of the camera 13 for adjusting the interocular spacing and the convergence distance setting of the camera assembly 10. More particularly, these bolts 59 extend downwardly from the mounting shoe 50 through cylindrical spacers 82 within slots 83 in the frame baseplate 25 and are fastened into a camera link 84, as shown best in FIG. 13. This camera link 84 comprises one end link or bar of a four-bar linkage constituting the mechanical control linkage 20 and moves with the camera 13 throughout the various adjustments in interocular spacing and convergence distance setting.

The mechanical control linkage 20 is disposed within an appropriately shaped cavity 86 on the underside of the frame baseplate 25 and is conveniently closed by a bottom closure plate 87 which may carry a wedge-shaped foot 89 (FIG. 7) at its underside for facilitated mounting of the entire camera assembly to an appropriate mounting shoe (not shown) in the same manner as described above with respect to the cameras. As shown in FIGS. 13-15, this mechanical control linkage includes a pair of relatively long side links 85 which are connected respectively at their rear ends by pivot pins 88 and 88' to the opposite ends of the comparatively substantially shorter camera end link 84. The opposite or forward ends of the elongated side links 85 are similarly connected respectively by additional pivot pins 89 and 89' to a relatively short frame link 90 in the form of a rotatable shaft supported by the baseplate 25 against pivoting movement. Accordingly, the side links 85 cooperate with the camera link 84 and the frame link 90 to define a horizontally oriented four-bar linkage permitting generally lateral swinging movement of the camera link 84 and the camera 13 within the limits of the arcuate baseplate slots 83.

Figure 21:
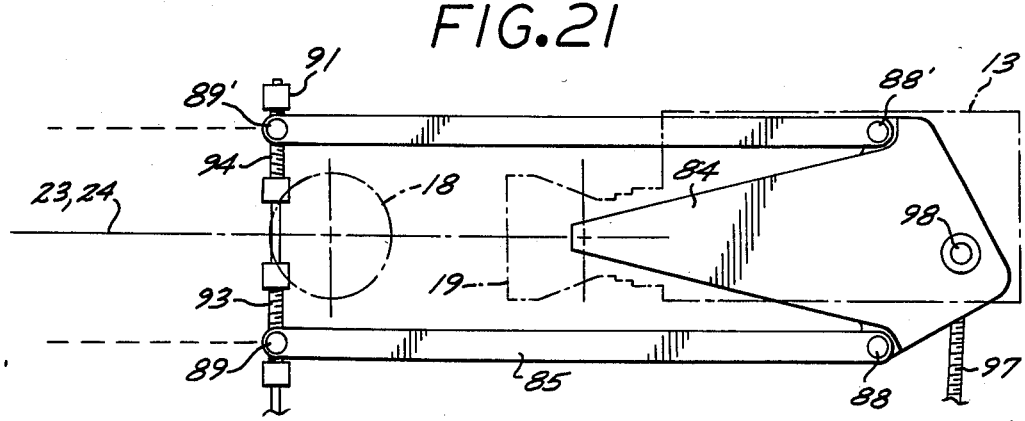
FIG. 21 is a somewhat schematic diagram illustrating the camera adjustment control linkage in one position of adjustment.
Figure 22:
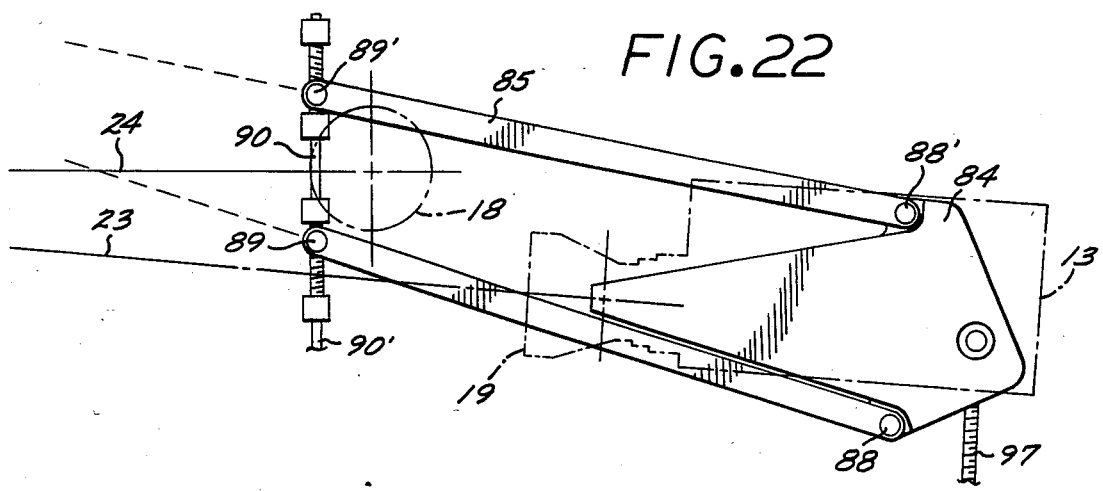
FIG. 22 is a somewhat schematic diagram similar to FIG. 21 and illustrating the camera control linkage in an alternative position of adjustment.

The frame link 90 comprises the rotatable shaft extending transversely within the baseplate cavity 86 and supported against displacement against its own axis by a plurality of shaft bearing blocks 91. These bearing blocks 91 are installed at selected positions conveniently by use of screws 92 or the like, as shown in FIG. 15, with the blocks 91 abutting opposite ends of two oppositely threaded lead screw portions 93 and 94 formed on the shaft 90. These lead screw portions 93 and 94 respectively carry the front pivot pins 89 and 89' coupled to the side links 85 whereby these pivot pins constitute lead screw nuts movable along the shaft 90 toward and away from each other as the shaft 90 is rotated. Accordingly, the length of the frame link is defined by the spacing between the pivot pins 89 and 89' wherein this spacing is adjustable upon rotation of the shaft 90. As depicted schematically in FIGS. 21 and 22, the preferred form of the invention provides for such pivot pin adjustment between a spacing generally corresponding with the length of the camera end link 84 defined by the distance between the pivot pins 88 and 88' such that the four-bar linkage constitutes a parallelogram pivotal about the pivot pins 88, 88', 89 and 89' (FIG. 21), and a trapezoidal shape with the frame link length substantially less than the camera link length such that the side links 85 converge in a forward direction from the camera link toward a mechanical instant center (FIG. 22)

and causing the camera sight lines to intersect substantially at the same distance as the instant center.

Rotation of the frame link shaft 90 is achieved in a controlled manner by means of a shaft extension 90' projecting transversely from the bearing blocks 91 and including an additional threaded portion 95 within the baseplate cavity 86 before passing through a side wall of the cavity to project outwardly therefrom. A knurled control knob 96 or the like is attached to the outwardly projecting end of the shaft extension 90' for facilitated manual shaft rotation.

The mechanical control linkage 20 is thus pivotally movable in a horizontal direction within the baseplate cavity 86 to shift horizontally the position of the supported movable camera 13 with respect to the stationary camera 12. Such horizontal displacement of the movable camera 13 alters the interocular spacing between the lens units 18 and 19 of the two cameras to correspondingly control depth characteristics of projected photographic images produced by the two cameras. The horizonal control linkage displacement is advantageously controlled for precision adjustment by a control rod 97 having an inboard end threaded into a nut pin 98 suitably secured to a rearward extension of the camera link 84, as viewed in FIG. 19, and an outboard reduced diameter end 97' projecting through a side wall of the baseplate cavity 86 and secured into a control knob 99 which is conveniently knurled for facilitated manual rotation. A portion of the reduced diameter end 97' of the control rod 97 is positioned within a counterbore 100 in the baseplate cavity side wall, within which is fitted an anchor pin 102 for rotation about its own axis and oriented perpendicular to the baseplate, wherein this pin receives and supports the reduced diameter end 97' of the control rod to permit control rod rotation without axial control rod displacement.

The interocular spacing of the cameras 12 and 13 is thus closely and accurately controllable by rotating the knurled control knob 99 thereby advancing or retracting the nut pin 98 along the control rod. This results in a corresponding displacement of the camera end link 84 together with the camera 13 in a horizontal direction. Conveniently, the tolerances provided by the anchor pin 102 within the baseplate cavity side wall are sufficiently loose to permit slight arcuate swinging of the control rod as the camera end link is moved back and forth to adjust the interocular spacing.

The particular interocular spacing selected in accordance with rotation of the control rod 97 is indicated by a graduated tape scale 104 having a short portion thereof exposed to view through a relatively small viewing window 106 in the baseplate 25. This tape scale 104, as shown best in FIGS. 13 and 16, comprises a graduated metal tape or the like having one end fastened as by a screw 108 to a forward extension of the camera end link 84 at a position aligned generally directly below the nodal point 81 of the lens unit 19 for the movable camera 13. From the screw 108, the tape scale 104 extends transversely and is wrapped about one-half the diameter of a roller 109 at one side of the baseplate cavity 86 and then extends transversely across the cavity and beneath the viewing window 106 for similar wrapping over a second roller 110. Finally, the tape scale projects back toward the camera end link for connection to a spring 112 which is in turn coupled to the end link 84 and functions to maintain the tape scale relatively taut.

As viewed in FIGS. 3 and 20, the viewing window 106 for the tape scale 104 is spaced a short distance behind the upright support plate 26 and is bounded by pointed indicators 114 for association with numerical markings on the tape scale 104 which indicate the camera interocular spacing, in inches. More particularly, as viewed in FIG. 20, interocular spacing adjustment is comtemplated from an initial magnitude of zero, as viewed in FIG. 20, wherein the movable camera 13 is orientd for sight line coincidence with the stationary camera 12. Horizontal shifting of the control linkage 20, however, is contemplated within a range of up to about four inches, thereby providing capability for increasing or decreasing three-dimensional depth effects from that normally perceived by normal vision wherein the average interocular spacing between the right and left eyes of an adult is about 2.5 inches.

The mechanical control linkage is further adjustable to control the convergence distance setting of the cameras as a separate adjustment from interocular spacing control by rotating the other knurled control knob 96 to alter the length of the frame end link 90, as described above. More specifically, rotation of the control knob 96 rotates the frame link shaft to move the pivot pins 89 and 89' toward or away from each other. This pivot pin movement results in a change of distance at which the camera sight lines intersect. Subsequent adjustments in interocular spacing, upon rotation of the knob 99, cause the movable camera 13 to pivot about the selected convergence distance substantially without altering the convergence distance.

Visible indication of the specific convergence distance setting is provided by a slide scale 116 viewable through a viewing window 118 in the base plate. This slide scale, as shown best in FIGS. 13, 17, 18, and 20, comprises an elongated strip slidably received into a groove 120 beneath the viewing window 118. An elongated pin slot 122 in the underside of the slide scale receives a pin 124 upstanding from one end of a pivot link 126 pivoted generally centrally by a shouldered screw 128 which permits pivoting link motion to displace the slide scale 116 back and forth within the viewing window 118. The opposite end of the pivot link includes forked yokes 130 which define slots for receiving a pin 132 on a lead nut 134 threaded onto the threaded portion 95 of the shaft extension 90'. Accordingly, rotation of the associated control knob 96 displaces the lead nut 134 to pivot the pivot link 126 in a manner causing sliding movement of the slide scale 116 as the convergence distance setting is altered. The particular convergence distance setting is reflected by indicia on the slide scale which is correlated with pointed indicators 136 on the baseplate, with a preferred convergence distance setting range being on the order of about four feet from the lens unit nodal points to infinity, as illustrated by the slide scale indicia depicted in FIG. 20.

A major advantage provided by the mechanical four-bar control linkage is that the paths of movement of the camera link 84 for the various interocular spacing and convergence distance setting positions results in a particularly high degree of substantially independent control over these adjustable parameters. More particularly, for any given convergence distance setting, with maximum and minimum convergence distance settings being depicted respectively in the schematic illustrations of FIGS. 21 and 22, the convergence distance setting remains constant or does not change appreciably within acceptable tolerance limits as the camera is adjusted between zero interocular spacing, as shown in FIG. 21, and a maximum interocular spacing, as shown in FIG. 22. This substantially constant nature of convergence distance setting throughout interocular spacing adjustment arises in large degree from the substantially parallelogram nature of the four-bar linkage, together with the relatively long lengths of the side links 85 in comparison with the lengths of the camera link 84 and the frame link 90. For example, in a preferred working version of the invention, the side links 85 were chosen to have a length of about twenty inches, whereas the camera end link 84 was chosen to have a length of about seven inches, and the frame link pivot pins 89 and 89' were adjustable for spacing ranging between about four inches to seven inches. With this arrangement, any variations in convergence setting occurring throughout interocular spacing adjustment were found to have virtually negligible impact upon the 3-D effects of photographed images.

In addition, the generally parallelogram nature of the control linkage 20 results in minimal variation in interocular spacing throughout changes in convergence distance setting. More particularly, for any selected interocular spacing in accordance with rotation of the control knob 99, the convergence distance setting can be changed as desired within its prescribed range of adjustment with minimal or no change in interocular spacing wherein any such minimal change is acceptable for most three-dimensional photography applications. Any change which does occur in interocular spacing as a result of convergence setting adjustment is reflected by the tape scale 104 which shifts with the nodal point of the lens unit 19, irrespective of nonrotation of the control knob 99, to reflect actual interocular spacing which can be easily readjusted to the desired setting by minor rotation of the control knob 99.

Figure 23:
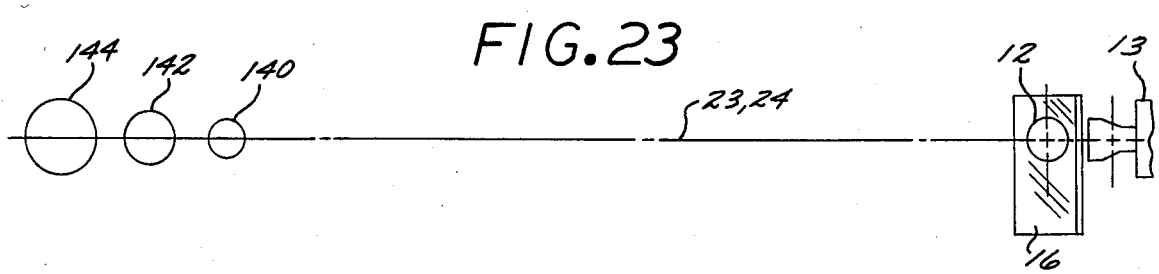
FIG. 23 is a schematic diagram illustrating use of the camera assembly for photographing images without three-dimensional effect.

The camera assembly 10 of this invention can thus be adjusted quickly and easily with substantially no interaction of the setting of the interocular spacing and convergence distance to provide substantially independent varying of selected 3-D effects, as desired. For example, the convergence distance setting can be adjusted to infinity and the interocular spacing can be adjusted to zero thereby placing the movable camera 13 for sight line coincidence with the stationary camera 12, as depicted in FIG. 23. This permits both cameras to photograph subjects 140, 142, and 144 within a scene from the same view without any 3-D effect. With the convergence setting remaining at infinity, the interocular spacing can be increased by laterally displacing the movable camera 13, in which case the two cameras are positioned to photograph the subjects along parallel sight lines.

Figure 24:
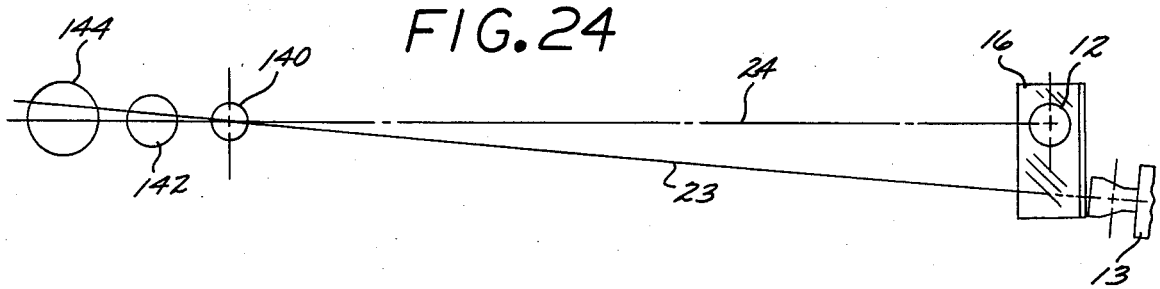
FIGS. 24-26 respectively comprise schematic diagrams generally similar to FIG. 23 but illustrating use of the camera assembly to photograph images with varying three-dimensional effects.
Figure 25:
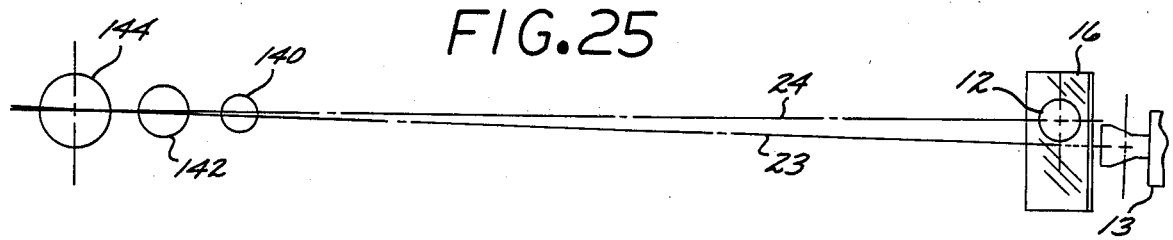
Figure 26:
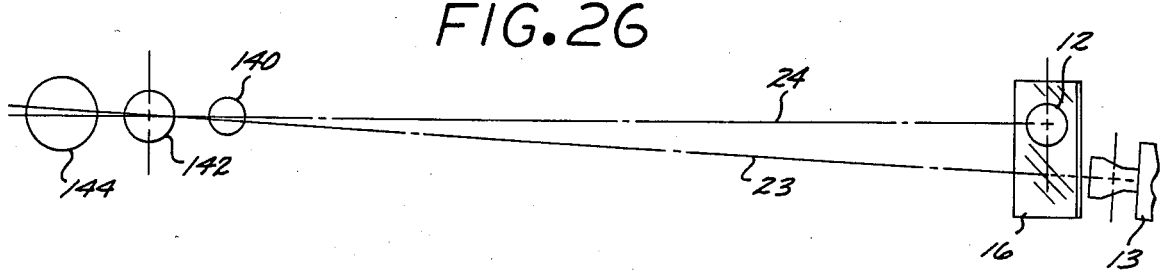

As shown in FIG. 24, with a given interocular spacing as indicated by lateral displacement of the movable camera 13, the convergence setting can be selected to angularly turn the camera 13 for intersection of its sight line 23 with the sight line 24 of the stationary camera at a point generally corresponding with the foreground subject 140. Alternatively, the convergence setting can be adjusted for intersection of the sight line at a point corresponding with the background subject 144, as viewed in FIG. 25, or the intermediate subject 142, as viewed in FIG. 26. In any case, the interocular spacing can be altered from that depicted in FIGS. 24–26 without significantly changing the point of intersection of the camera sight lines within the scene being photographed. In this regard, the preferred operation of the camera assembly is to first select the convergence distance setting and then to vary interocular spacing as desired.

Figure 27:
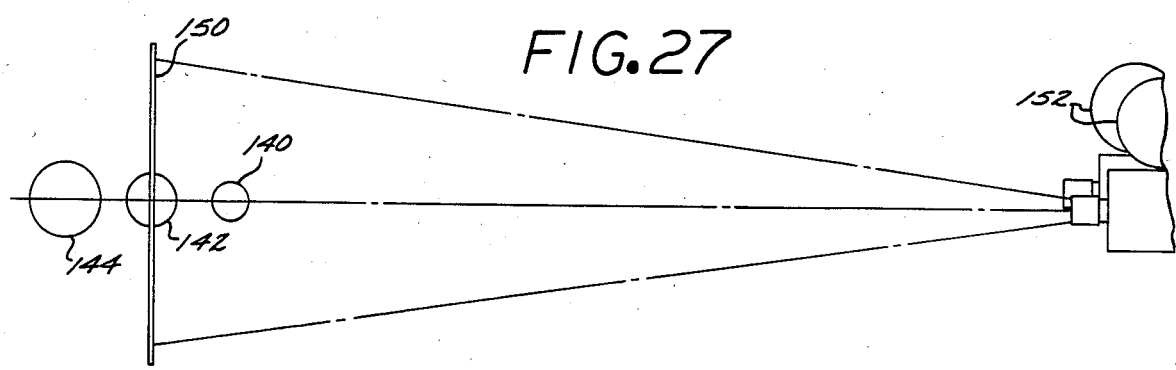
FIG. 27 is a schematic diagram illustrating projection of photographed images onto a projection screen.

Variation in interocular spacing impacts three-dimensional depth aspects of the resultant photographed images when projected, normally in superimposed relation, onto a projection screen 150 by a pair of projectors 152, as shown in FIG. 27. For example, an interocular spacing of about 2.5 inches provides three-dimensional effects generally corresponding with those perceived by an average sized adult standing in the position of the camera assembly. Smaller interocular spacings tend to provide reduced depth effect, whereas larger interocular spacings tend to enhance depth effect. Moreover, decreasing of interocular spacing during filming of a subject tends to cause the subject to appear to grow in size, whereas interocular spacing increases during subject filming has the reverse effect of making the subject appear to shrink in size.

The convergence distance setting controls the perceived distance location of filmed subjects relative to the projection screen 150. For example, when the intermediate subject 142 corresponds with the location of the camera sight line intersection during filming, that intermediate subject when projected onto the screen 150 will appear to be located generally at the screen. The foreground subject 140 will appear to the audience to be positioned in front of the screen, and the background subject 144 will appear to be located behind the screen. Similarly, alternate convergence distance settings can control which subject appears to be located at the screen position, and the convergence distance setting can be changed during filming of a given scene to provide the appearance of the subject moving toward or away from the audience's position relative to the screen, which is also referred to as the "stereo window" in 3-D photography.

Figure 28:
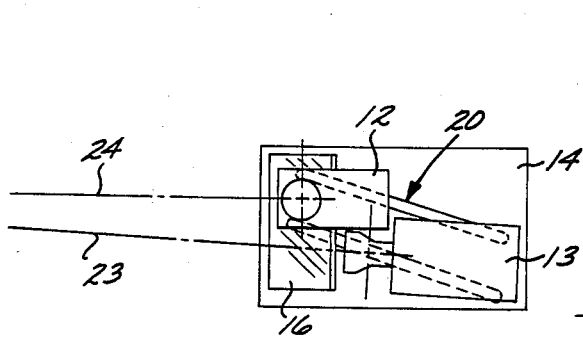
FIG. 28 is a schematic diagram generally representing a top plan view of the camera assembly of FIG. 1.

FIG. 28 illustrates in schematic plan view the preferred arrangement of the invention including the stationary camera 12 oriented to look downwardly onto a front angled surface of the beamsplitter 16 and the movable camera 13 supported on the four-bar control linkage 20 and receiving light transmitted through the beamsplitter 16. This arrangement of the cameras advantageously provides a relatively compact camera assembly particularly in terms of lateral dimension which is highly desirable for ease of handling in many filming situations. A further advantage is that the scene being photographed has its narrower dimension, namely, the height, elongated on the reflective front surface of the beamsplitter 16, thereby permitting use of an optimally compact size beamsplitter. Moreover, such elongation of the scene height rather than width makes possible the use of wider angle lenses than have otherwise been available for use in 3-D photography, wherein such wide angle lenses can be desirable for some scenes.

Figure 29:
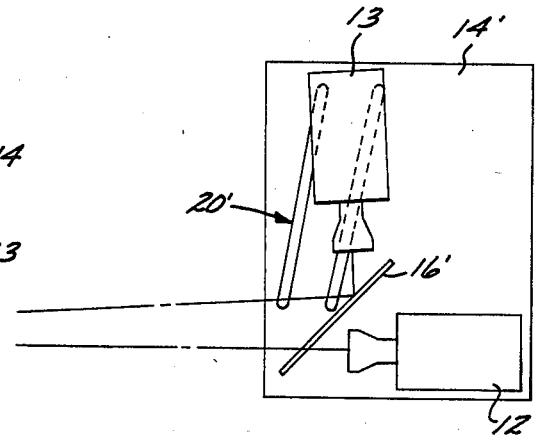
FIG. 29 is a generally schematic top plan view depicting an alternative configuration of the camera assembly.

An alternative arrangement of the cameras is depicted in schematic plan view in FIG. 29 wherein the stationary and movable cameras 12 and 13 are positioned generally in an orthogonal relation within the same horizontal plane on a platelike frame 14'. In this arrangement, the stationary camera 12 is mounted on the frame 14' to receive light passing directly through an angularly oriented beamsplitter 16', whereas the movable camera 13 is supported on a four-bar control linkage 20' and positioned to receive light reflected from a front surface of the beamsplitter 16'. This alternative arrangement for the camera assembly has a greater lateral size but is shorter in height than the arrangement depicted in FIG. 28, wherein a shorter camera assembly may be advantageous in some circumstances.

The camera assembly 10 of the present invention thus provides a highly versatile and accurately controllable assembly for selecting and varying 3-D effects of photographed images. 3-D effects can be controlled precisely and substantially independently to provide significantly enhanced utility in the production of 3-D photographs, particularly such as motion pictures.

A variety of modifications and improvements to the three-dimensional camera assembly of the present invention are believed to be apparent to one of ordinary skill in the art. For example, the various camera adjustments, such as interocular spacing and convergence distance setting can be rendered subject to motorized control rather than in response to the manually operated control knobs as disclosed in the exemplary embodiment. Accordingly, no limitation on the present invention is intended, except by way of the appended claims.

What is clamed is:

1. A camera assembly for three-dimensional photography, comprising:
   a frame;
   a beamsplitter on said frame for receiving light from a scene and for separating the received light into substantially equal reflected and transmitted portions;
   a first camera on said frame for receiving one of the reflected and transmitted light portions;
   a second camera on said frame for receiving the other of the reflected and transmitted light portions; and
   a mechanical control linkage movably supporting said second camera with respect to said frame, said control linkage including means for substantially independently displacing said second camera relative to said first camera to selectively adjust the interocular spacing between said first and second cameras and for displacing said second camera relative to said first camera to selectively adjust the angular relationship of the sight lines of said first and second cameras.

2. The camera assembly of claim 1 wherein said first and second camera are supported by said frame in a generally orthogonal relationship.

3. The camera assembly of claim 1 wherein said first camera is mounted in a stationary position on said frame for receiving the reflected light portion from said beamsplitter, said second camera receiving the transmitted light portion.

4. The camera assembly of claim 1 wherein said first camera is mounted in a stationary position on said frame for receiving the transmitted light portion from said beamsplitter, said second camera receiving the reflected light portion.

5. The camera assembly of claim 1 including means for removably mounting said first camera on said frame and means for removably mounting said second camera on said control linkage.

6. The camera assembly of claim 5 wherein said mounting means includes locking means for securing and positively seating first and second cameras respectively in predetermined positions relative to said beamsplitter.

7. The camera assembly of claim 1 including means for mounting said beamsplitter in a stationary position on said frame.

8. The camera assembly of claim 1 wherein said control linkage comprises a four-bar linkage having a pair of side links connected between a pair of end links, one of said end links being movable with said second camera and the other of said end links being mounted on said frame, said four-bar linkage being pivotally movable for displacing said second camera to selectively adjust the interocular spacing between said first and second cameras.

9. The camera assembly of claim 8 including spacing control means for controllably and pivotally moving said four-bar linkage to adjust the interocular spacing between said first and second cameras.

10. The camera assembly of claim 8 wherein said other end link of said four-bar linkage is variable in length to selectively adjust the orientation of said second camera relative to said first camera and to correspondingly adjust the angular relationship of the sight lines of said first and second cameras.

11. The camera assembly of claim 10 including angle control means for controllably adjusting the orientation of said second camera relative to said first camera.

12. A camera assembly for three-dimensional photography, comprising:
    a frame;
    a pair of cameras on said frame each having a sight line oriented for receiving light from a scene;
    first adjustment means for movably supporting at least one of said cameras for relative movement with respect to said frame and the other of said cameras in a generally lateral direction to adjustably select the interocular spacing between said cameras substantially without altering the angular relationship between the sight lines of said cameras; and
    second adjustment means for movably supporting at least one of said cameras for generally angular movement with respect to said frame and the other of said cameras to adjustably select the angular relationship between the camera sight lines with minimal alteration in the interocular spacing between said cameras.

13. The camera assembly of claim 12 including a beamsplitter mounted in a stationary position on said frame for receiving light from a scene and for separating the received light into substantially equal reflected and transmitted portions, said pair of cameras being supported on said frame for respective reception of the reflected and transmitted light.

14. The camera assembly of claim 12 wherein said first adjustment means comprises a four-bar linkage having a pair of side links coupled pivotally between a frame end link on said frame and a camera end link movable with one of said cameras.

15. The camera assembly of claim 14 wherein said second adjustment means comprises means for adjustably varying the length of said frame end link.

16. The camera assembly of claim 14 wherein said side links are substantially longer in length than said frame and camera end links.

17. The camera assembly of claim 12 including first scale means visibly mounted on said frame and coupled to said first adjustment means for indicating the interocular spacing between the cameras and second scale means visibly mounted on said frame and coupled to said second adjustment means for indicating the distance at which the camera sight lines intersect.

18. A camera assembly for supporting first and second cameras for three-dimensional photography, comprising:
a frame;
a beamsplitter mounted in a stationary position on said frame for receiving light from a scene and for separating the received light into substantially equal reflected and transmitted portions;
a first camera mount for mounting the first camera on said frame in a stationary predetermined position relative to said beamsplitter for reception by the first camera of one of the reflected and transmitted light portions;
a four-bar linkage having a relatively long pair of side links coupled pivotally between a comparatively shorter pair of end links, one of said end links being nonpivotally mounted on said frame;
a second camera mount for mounting the second camera for movement with the other of said end links in a predetermined position relative to said beamsplitter for reception by the second camera of the other of the reflected and transmitted light portions;
interocular spacing adjustment means for pivotally moving said four-bar linkage with respect to said one end link for adjustably selecting the lateral spacing between the first and second cameras when respectively mounted on said first and second camera mounts substantially without altering the convergence relationship between sight lines of the first and second cameras; and
convergence distance setting adjustment means for controllably varying the length of said one end link for adjustably selecting the distance at which the sight line of the second camera intersects the sight line of the first camera when the cameras are respectively mounted on said first and second camera mounts, with minimal corresponding alteration in the lateral spacing between the cameras.

19. The camera assembly of claim 18 including reference scale means visibly mounted on said frame and coupled to said four-bar linkage for indicating the lateral spacing between the cameras and for indicating the distance at which the camera sight lines intersect.

20. The camera assembly of claim 18 including a beamsplitter mounting bracket plate fixed onto said frame and defining a central opening bounded by a gasket recess, a resilient mounting gasket of generally channel-shaped cross section extending about and receiving the periphery of said beamsplitter and seated within said gasket recess, and retaining means for retaining said gasket securely within said gasket recess.

21. The camera assembly of claim 20 wherein said retaining means comprises an apertured retaining plate overlying said beamsplitter and said gasket and connected onto said mounting bracket plate.

22. The camera assembly of claim 20 wherein said mounting bracket plate is mounted within a beamsplitter housing on said frame, said housing having a front opening for reception of light from the scene, a first viewing opening for passage of the reflected light portion from said housing, and a second viewing opening for passage of the transmitted light portion from said housing.

23. The camera assembly of claim 22 wherein the one of said first and second viewing openings in said beamsplitter housing for passage of light to the second camera is laterally elongated in shape.

24. The camera assembly of claim 18 wherein said four-bar linkage is movably disposed within a linkage housing formed in said frame, said second camera mount being disposed outside said linkage housing, and including means extending through slots formed in said linkage housing for coupling said second camera mount to said four-bar linkage.

25. The camera assembly of claim 18 wherein said interocular spacing adjustment means comprises a control rod threadably connected to said other end link, and means accessibly mounted on said control rod for rotating said control rod.

26. The camera assembly of claim 25 wherein the first and second cameras have respective lens units each having a nodal point and said second camera mount being for supporting the second camera with the nodal point of the second camera lens unit in a predetermined position relative to said beamsplitter, and further including a graduated tape scale coupled to said other end link at a position aligned with the second camera lens unit nodal point for movement with the second camera lens unit nodal point, said frame including indicator means associated with said tape scale for indicating the lateral spacing between the nodal points of the lens units of the first and second cameras.

27. The camera assembly of claim 18 wherein said one end link comprises a shaft rotatably mounted on said frame, and wherein said convergence distance setting adjustment means comprises a pair of axially spaced oppositely threaded lead screw portions on said shaft, a pair of lead screw nuts respectively threaded onto said lead screw portions and respectively pivotally coupled to said side links, and a control knob accessibly mounted on said shaft for rotating said shaft thereby displacing said lead screw pivot nuts toward or away from each other in accordance with the direction of shaft rotation.

28. The camera assembly of claim 27 further including a third threaded portion on said shaft, a third lead screw nut threaded onto said third threaded portion, a slide scale slidably supported on said frame, a pivot link generally centrally pivoted to said frame and coupled between said third nut and said slide scale for slidably moving said side scale in response to shaft rotation, and indicator means on said frame in association with said slide scale for indicating the distance at which the sight lines of the cameras intersect.

29. The camera assembly of claim 18 wherein each of said first and second camera mounts comprises a first mounting member on the associated camera, a second mounting member for sliding interfitting engagement with said first mounting member, and a locking assembly on one of said first and second mounting members for releasably locking said members together, said locking assembly including a rotatable bolt, a locking cylinder on said bolt and having on its radially outer periphery an arcuate lobe for rotation into a recess formed in the other of said members to lock said members together and a radially recessed flat for rotation to a position aligned with said recess to permit sliding movement between said members.

30. The camera assembly of claim 29 wherein said locking cylinder is threadedly carried on said locking bolt and further including stop means acting between said locking cylinder and said one member to limit locking cylinder rotation relative to the locking recess to first and second positions with said lobe and flat respectively aligned with the recess whereby continued rotation of said locking bolt axially displaces said locking cylinder along said locking bolt, said locking cylinder being axially movable into bearing engagement with a shoulder at one side of the locking recess to positively seat said first member in a predetermined position relative to said second member.

31. A mounting assembly for securely mounting a mirror on a camera assembly frame, comprising:
   a mounting bracket plate mounted on said frame and defining a central opening bounded by a gasket recess;
   a resilient mounting gasket of generally channel-shaped cross section for extending about and receiving the periphery of the mirror and for seated reception into the gasket recess; and
   retaining means for retaining said gasket securely within the gasket recess, said retaining means comprising an apertured retaining plate overlying the mirror and said gasket and connected onto said mounting bracket plate.

32. The mounting assembly of claim 31 wherein the mirror comprises a beamsplitter for separating incident light into substantially equal reflected and transmitted light portions.

33. The mounting assembly of claim 32 wherein one marginal edge of said retaining plate is secured by reception into a slot formed by said mounting bracket plate.

34. The mounting assembly of claim 32 wherein said mounting bracket plate is mounted within a beam-splitter housing on the frame, said housing having a front opening for reception of light, a first viewing opening for passage of the reflected light portion from said housing, and a second viewing opening for passage of the transmitted light portion from said housing, said mounting bracket plate having one margin thereof seated within a recess formed in said housing and an opposite margin thereof cooperating with said housing to define an interfitting key and keyway for fixing the position of said opposite margin.

35. For use in a camera assembly including a camera and a support frame, a camera mount comprising:
   first and second slidably interfitting mounting members respectively carried by the camera and the frame; and
   a locking assembly on one of said first and second mounting members for releasably locking said members together, said locking assembly including a rotatable bolt, a locking cylinder threadedly carried on said bolt and having on its radially outer periphery an arcuate lobe for rotation into a recess formed in the other of said members to lock said members together and a radially recessed flat for rotation to a position alighed with said recess to permit sliding movement between said members.

36. For use in a camera mount having first and second slidably interfitting mounting members, a locking assembly comprising:
   a locking bolt rotatably supported within an open well formed in said first member and including a threaded portion within the well, said locking bolt further having a portion extending to a position outside the well;
   a handle member on said portion of the locking bolt outside the well;
   a locking cylinder threaded onto said bolt threaded portion and including about its periphery an arcuate lobe, a radially recessed flat, and a radially recessed arcuate slot; and
   a stop pin within the well and positioned within the arcuate slot of said locking cylinder to limit cylinder rotation within the well between a first position with said lobe projecting out of the well and a second position with said flat facing toward the open side of the well;
   said lobe being receivable when said locking cylinder is in said first position into a recess formed in said second member to lock said members together and said flat being aligned with the recess when said locking cylinder is in said second position to permit sliding movement between said members;
   said locking bolt being rotatable beyond that required to move said locking cylinder between said first and second position to axially move said cylinder along said bolt, said lobe being axially engageable with a shoulder at one side of the recess in said second member to positively seat and lock said members with respect to each other.

* * * * *